United States Patent [19]
Janex

[11] Patent Number: 5,544,075
[45] Date of Patent: Aug. 6, 1996

[54] METHOD TO OPTIMIZE THE BIT RATE OF A COMMUNICATIONS CHANNEL IN TIME-DIVISION MODE

[75] Inventor: Albert Janex, Cachan, France

[73] Assignee: Thomson-CSF, Paris, France

[21] Appl. No.: 272,394

[22] Filed: Jul. 20, 1994

[30] Foreign Application Priority Data

Jul. 20, 1993 [FR] France ................................ 93 08891

[51] Int. Cl.$^6$ ............................................. H04J 3/16
[52] U.S. Cl. ................................ 364/514 R; 370/95.1; 370/95.3
[58] Field of Search ........................... 364/514 A, 514 B, 364/514 C, 514 R; 370/95.1, 95.3

[56] References Cited

U.S. PATENT DOCUMENTS

| | | | |
|---|---|---|---|
| 4,574,378 | 3/1986 | Kobayashi | 370/104 |
| 4,612,637 | 9/1986 | Davis et al. | 370/95 |
| 4,736,371 | 4/1988 | Tejima et al. | 370/95 |
| 5,012,469 | 4/1991 | Sardana | 370/95.3 |
| 5,278,833 | 1/1994 | Crisler et al. | 370/95.1 |
| 5,295,140 | 3/1994 | Crisler et al. | 370/94.1 |
| 5,303,234 | 4/1994 | Kou | 370/85.2 |
| 5,307,349 | 4/1994 | Shloss et al. | 370/85.2 |
| 5,347,521 | 9/1994 | Zijderhand | 370/85.3 |
| 5,384,777 | 1/1995 | Ahmadi et al. | 370/85.2 |
| 5,425,032 | 6/1995 | Shloss et al. | 370/95.2 |
| 5,434,847 | 7/1995 | Kou | 370/17 |
| 5,448,621 | 9/1995 | Knudsen | 379/58 |

FOREIGN PATENT DOCUMENTS

A-2438877  5/1980  France .

OTHER PUBLICATIONS

Tencon, Nov., 1989, New York, US; R. K. Pankaj, et al. "Two Multi Access Algorithms For Channel For Multiple Reception Capacity". pp. 798–803.

Tanenbaum, *Computer Networks*, pp. 121–126, 1989.

Ross et al., "Throughput Increase of ALOHA–based Systems with Multiuser Sequence Detection", Conference held Jun. 1993, Third Canadian Workshop.

*Primary Examiner*—Emanuel T. Voeltz
*Assistant Examiner*—Patrick J. Assouad
*Attorney, Agent, or Firm*—Oblon, Spivak, McClelland, Maier & Neustadt, P.C.

[57] ABSTRACT

A method whereby a moving body searches for an unoccupied time slot in a time-division communications channel for the transmission of a message. The moving body participates with other moving bodies located in the same geographical zone in an anti-collision system with the time being conventionally divided into reproducible time periods T. Each period includes a number N of time slots reference 1, 2, 3 . . . i . . N with the access to a time slot for the transmission of a message from the moving body being accomplished by identifying an unoccupied time slot during at least one listening period T, followed by a random choice of one slot i from among the slots identified as being unoccupied. For at least one period after the moving body has occupied slot i, the time of this slot is divided randomly into reception sub-slots R and transmission sub-slots E. As long as no transmission from another moving body is received during the reception sub-slots R, a transmission is begun or continued during the following transmission sub-slots E of the current slot i and slot i is kept during the subsequent period. On the other hand, if a transmission is received from another moving body during a reception sub-slot R, there is no transmission or there is no longer any transmission made during the following transmission periods E planned in the slots i, and a new unoccupied slot j is chosen. The above operations are repeated on slot j and if a transmission is received from another moving body, the transmission is once again prohibited or no longer made during subsequent transmission periods planned in the slot j.

10 Claims, 2 Drawing Sheets

METHOD TO OPTIMIZE THE BIT RATE OF A COMMUNICATIONS CHANNEL IN TIME-DIVISION MODE

BACKGROUND OF THE INVENTION

1. Field of the Invention

The invention pertains to the field of methods of access to a communications channel working in time-division mode, especially for a traffic management system.

2. Description of the Background

There currently exist studies of anti-collision systems or traffic management systems, relating for example to air traffic or sea traffic, in which each moving body participating in the system periodically sends out a standardized message. This message has information on the geographical position of the moving body and, if necessary, other information used for avoidance maneuvers, such as information relating to course, speed, next course, etc. A particular embodiment of a system such as this is described in the French patent application No. FR 92.03714 filed on behalf of the present Applicant. According to this mode, the time is conventionally divided into time periods T, and each period is itself divided into a number N of slots, each slot being referenced by an index 1, 2, 3 ... i ... N. Synchronization is maintained in a known way between the different moving bodies participating in the system, by the distribution of a universal time that is broadcast from a station whose position is known. Since each moving body knows its own position, it can get synchronized by taking account of the time taken by the synchronization information to travel between itself and the broadcasting station. The assigning of a transmission slot to a moving body participating in the system is done from a central station, for example one of the users.

This then results in an optimal use of the channel, whose load may approach 100% (giving a channel that is permanently occupied, with neither idle time, nor the collision of messages).

This approach, known as TDMA (Time Division Multiple Access) is not always desirable (because of the vulnerability of the "conductor") or possible (because of swarming by the mobile users).

This is why it is also provided, in certain systems, that access to the network will be got randomly. Each participant listens on the frequency and identifies the occupied slots, and then transmits by making a random choice of one of the unoccupied slots, hoping that no new (or former) user would have chosen this very same slot.

The success rate is high when the channel is not at all busy. The risk of collision among messages (from different users) increases with the load of the channel and tends towards the pollution of all the messages. Statistical computations indicate a value equal to 1/e (i.e. 36.8%) as being the maximum permissible load.

This technique of access is known as the slotted ALOHA technique. As compared with an access technique without slotting and without synchronization, the slotted technique enables the capacity of the channel to be doubled because there is no partial overlapping. A message is either entirely polluted or not polluted at all.

The method according to the invention can be applied to a slotted ALOHA type system. It is aimed at increasing the real capacity of the channel, all other conditions, especially the lengths of the periods and the slots, being furthermore equal. In a particular embodiment, it is also aimed at enabling each moving body participating in the system to ascertain that the slot on which it is transmitting is not polluted by another user.

The method according to the invention is of the slotted ALOHA type. It is therefore a method in which the user mobile bodies are synchronized and in which the time is divided into periods with a duration T, each period being itself divided into N slots. One user message takes up one time slot. Access to the network is obtained after at least one listening period designed to identify the unoccupied slots, by a random choice of a slot identified as being unoccupied. It is specified that, in this type of known method as in the method according to the invention, each moving body transmits at least once per period and possibly several times if the frequency needed to produce its message is higher than the repetition frequency of the period T. In a known way, the repetition frequency of the message of a moving body increases with the proximity of this moving body to another moving body. When a moving body is at a great distance from other moving bodies, it is possible to reduce the frequency of its message.

The value of the period is defined precisely as a function of the lowest need, corresponding then to only one transmission per period.

This procedure makes it possible to stabilize the frame of the period. The frame of the period is constituted by the real presence of transmission in certain slots of the period. In order to facilitate access by new users, it is worth seeing to it that this frame is stable. A frame will be said to be stable if it changes only slowly. The ideal situation would be one wherein the frame changes only at the end of the occupancy of slots by the moving bodies leaving the zone and the occupancy of unoccupied slots by the moving bodies coming into the zone or by the moving bodies that are already present in the zone but need to increase the frequency of transmission of their message. In the known methods, owing to the mode of access to the network, no moving body is sure that the slot that it has chosen has not been chosen simultaneously by another moving body.

If this is so, the moving bodies transmitting on the same slot have no possibility of realizing that their own messages have been polluted by the simultaneous presence of other messages. In order to shorten the duration of simultaneous transmissions if any, and reduce their probability of occurrence, provision is made in the known methods for the moving bodies participating in the network to themselves change their slots from time to time. This possibility of changing slots increases the probability that one and the same unoccupied slot will be chosen by several moving bodies. The same unoccupied slot can be chosen not only by moving bodies gaining access to the network or to an additional slot but also by participants who merely wish to change their slot.

The method according to the invention is aimed at providing greater stability to the transmission frame. This stability of the frame results in easier access to the network by reducing the probability that one and the same unoccupied slot will be chosen by several moving bodies. In a complementary way, the invention is aimed at limiting changes of slots by a user already occupying a slot. The changing of a slot will occur only when the same slot is really occupied by at least one other moving body that is a user of the network. Owing to the above-mentioned advantages, the method enables the real capacity of the network to be increased.

The invention can be applied not only for the communications channel of an anti-collision system but also for any communications system using a single channel in time-division mode which each user uses only in ease of need. Depending on the urgency of the transmission of its message, the user will be led to search for one or more time slots within each period.

SUMMARY OF THE INVENTION

To these ends, an object of the invention is a method of searching for an unoccupied slot in a time-division communications channel, the time being conventionally divided into reproducible time periods T, each period comprising a number N of time slots referenced 1, 2, 3 . . . i . . . N, the access to a time slot for the transmission of the user's message comprising an identifying of the unoccupied time slots during at least one listening period T, followed by a random choice of one slot i from among the slots identified as being unoccupied, wherein:

a) for at least one period after the user has decided to occupy the slot i, the time of this slot i is distributed randomly into reception sub-slots R and transmission sub-slots E;

b) so long as no transmission from another user has been received during the reception sub-slots R, a transmission is begun or continued during the following transmission sub-slots E of the slot i in progress and the slot i is kept during the following period;

e) if a transmission is received from another user during a reception sub-slot R, there is no transmission made or there is no longer any transmission made during the following transmission periods E planned in the slot i in progress, and a new unoccupied slot j is chosen;

d) the above operations a) and b) are carried out again on the slot j, and if a transmission is received from another user, the operation e) is carried out again.

The general method described here above can be applied to any network of users sharing a common channel. When a user has an information element to transmit, it gains access to the channel by the method described and sends out its message fractionated into slots at a rate of at least one slot per period to ensure the stability of the frame. It leaves the channel at the end of transmission. In the ease more particularly covered by the invention, where the method is applied to a system of traffic management, the users are the moving bodies that are being managed and, possibly, fixed stations linked to these moving bodies. The information elements to be transmitted are essentially information elements pertaining to the management or control of traffic and the messages are generally standardized in order to reduce their duration. In this particular application, an object of the invention is a method by which a moving body can search for an unoccupied time slot in a time-division communications channel for the transmission of a message comprising at least one information element on geographical position, the moving body participating with other moving bodies located in one and the same geographical zone in an anticollision system in which the time is conventionally divided into reproducible time periods T, each period comprising a number N of time slots referenced 1, 2, 3 . . . i . . . N, the access to a time slot for the transmission of the message from the moving body being done by the identifying of the unoccupied time slots during at least one listening period T, followed by a random choice of one slot i from among the slots identified as being unoccupied, wherein:

a) for at least one period after the moving body has decided to occupy the slot i, the time of this slot i is divided randomly into reception sub-slots R and transmission sub-slots E;

b) so long as no transmission from another moving body has been received during the reception sub-slots R, a transmission is begun or continued during the following transmission sub-slots E of the slot i in progress and the slot i is kept during the following period;

c) if a transmission is received from another moving body during a reception sub-slot R, there is no transmission made or there is no longer any transmission made during the following transmission periods E planned in the slot i in progress, and a new unoccupied slot j is chosen;

d) the above operations a) and b) are carried out again on the slot j, and if a transmission is received from another moving body, the operation c) is carried out again.

The different ways of using this method shall be examined here below.

With this method, it is seen that, at the minimum, during the first period, when the moving body chooses to use the slot i, the transmission is designed only to reveal a presence or an intention of occupancy. For the first period, it may be advantageous to reduce the duration of the transmission sub-slots, namely to provide for transmission sub-slots that are short but nevertheless sufficient to be detected by the other moving bodies. Since the duration of the transmission sub-slots is determined by this criterion, it is only the length of the reception sub-slots R that will be fixed randomly during the step a).

If no transmission from another moving body has been received before the moving body has begun transmission, this moving body will make transmission during a first short sub-slot.

The other moving bodies will receive this transmission and will then refrain from transmitting on this sub-slot.

If $t_m$ designates the time taken for a transmitted message to travel between two moving bodies and if $t_r$ designates the time needed to detect a transmission, it is seen that with the method of the invention, used according to this first mode, the probability that a second moving body will transmit despite the transmission from a first moving body is equal to the probability that the second moving body will start transmitting during the time $t_m+t_r$, i.e. after the start of transmission of the first moving body but before it has been able to physically receive the transmission.

This probability is equal to:

$$N\frac{(t_m+t_r)}{T}$$

If two moving bodies start transmitting messages of equal duration in the first period, in the same slot i and at instants that are not distant from one another by more than $t_m+t_r$, they may believe themselves to be alone in the slot i and will therefore transmit again during the slot i of the first period during a new transmission sub-slot. The probability that these second sub-slots will start at instants that will not differ from each other by more than $t_m+t_r$ is equal to:

$$\frac{t_m+t_r}{\frac{T}{N}-\delta_1}$$

where $\alpha_1$ designates the time that has elapsed up to the end of the first transmission sub-slot. The total probability that the two moving bodies will continue to transmit on the same slot i during the following period will be, in all:

$$\frac{(t_m + t_r)^q}{\frac{T}{N}\left(\frac{T}{N} - \delta_1\right)\left(\frac{T}{N} - \delta_2\right)\left(\frac{T}{N} - \delta_{q-1}\right)}$$

wherein $\delta_1 \ldots \delta_{q-1}$ represent the periods of time that have elapsed up to respectively the end of the first (q–1) order transmission sub-slots and q represents the number of transmission sub-slots.

For the first period, it may also be advantageous to provide for only one transmission sub-slot whose start and duration are random. In this case, if no transmission is detected before the moving body has started transmitting, the probability that two moving bodies will start transmitting is:

$$N \frac{t_m + t_r}{T}$$

Since the duration of the message is random, the probability that the first moving body, for example, will receive the end of the message of the other moving body is, roughly, equal to the probability that the end of the reception of this message will have at least a duration $t_r$ located after the end of the transmission of the first message. Let $p_1$ be this probability. Similarly, if $p_2$ designates the probability that the second moving body will receive the end of the first moving body during a period at least equal to $t_r$, the probability that either of them will receive a transmission and stop its own transmission is equal to $p_1 + p_2 - p_1 p_2$.

Finally, it is naturally possible to carry out a division of the slot into transmission and reception sub-slots whose durations are random, the starting points being located at points in time that are randomly determined by being drawn by lot from among conventionally predetermined positions.

In any case, it has been seen that the probability that at least two moving bodies will choose the same unoccupied slot i is notably diminished as compared with known methods.

It will be noted that this period can be further diminished by the repetition of the precautions taken during a previous period in the course of some subsequent periods for example.

However the probability is not zero and to avoid having a large number of periods in which there are moving bodies using one and the same slot, it will be necessary, as in the known methods, to change the slot if necessary.

In the known methods, this change was done a priori randomly. In the method according to the invention, this change will be done only if the other moving body really occupies the slot. To this end, in the method according to the invention, a change will be made in the mode of distribution of the reception and transmission sub-slots.

Whereas the emphasis, in a phase of access comprising a small number of periods following the end of the total listening period, was laid rather on reception, the emphasis in an occupancy phase will be laid on the transmission period in making arrangement for reception sub-slots, for example, by eliminating the transmission of some information elements or by the random shifting of one or more sub-slots of a standardized duration provided for this purpose in the standardized message.

In this case, as here above, the first of the moving bodies which, during a reception sub-slot, has received a transmission from another moving body will stop making its transmission and will shift to another unoccupied slot.

It may be advantageous for technological reasons or for purposes of standardization of the messages to divide each slot conventionally into p sub-slots of equal durations.

In this case, the random character of the dividing of the sub-slots into transmission sub-slots and reception sub-slots will be done only by the choice of the rank of the sub-slots devoted to transmission or to reception.

In the latter case, the method according to the invention is characterized in that, at least for one period, the number of transmission sub-slots is at most equal to (p–1). Thus, provision is made for at least one reception sub-slot.

As in the case where the sub-slots are not divided, a priori, into equal sub-slots, the application of the method according to the invention will comprise two phases.

During a first phase, known as an access phase, the number of transmission sub-slots will be smaller than the number of reception sub-slots in order to favor reception. The probability that two moving bodies will start transmitting simultaneously in the same sub-slot for a first time is 1/p and the probability that the choice of the slot i will be kept by both moving bodies at the end of the first period is:

$$\frac{1}{P} \quad \frac{1}{(P - r_1)} \quad \frac{1}{(P - r_2)} \cdots \frac{1}{(p - r_s)}$$

where $r_1, r_2, \ldots, r_2$ represents the rank of the first transmission sub-slot and $r_s$ represents the rank of the s-order transmission slot.

The first phase could include a number of periods, which may or may not be consecutive, such that at the end of this phase the probability that the same slot will be occupied by two moving bodies is lower than a determined threshold.

During a second phase, known as a phase of occupancy or of holding the slot, the number of transmission sub-slots will be greater than the number of reception sub-slots.

BRIEF DESCRIPTION OF THE DRAWINGS

The invention shall now be illustrated by means of the appended explanatory drawings, of which.

DETAILED DESCRIPTION OF THE PREFERRED EMBODIMENT

Figure 1:
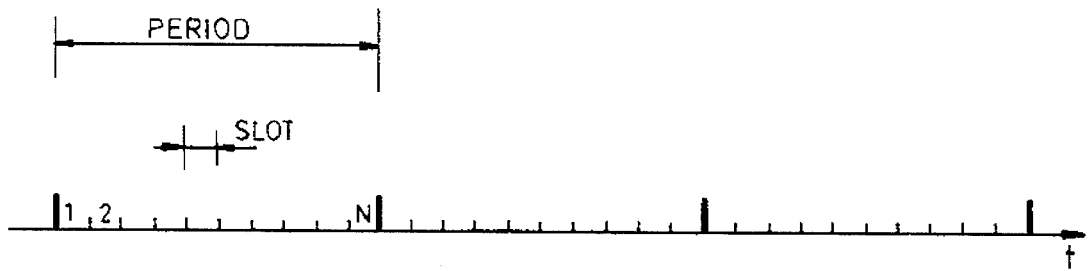
FIG. 1 shows the division of the time into periods, each period having N equal slots.

FIG. 1 illustrates a known mode of dividing time into periods which are themselves divided into N equal slots. For clarity's sake, N has been shown as being equal to 10 but, in practice, 1-minute periods are envisaged, each slot having a duration of 25 ms approximately, giving 2,400 slots per period. A time-division mode such as this is known as the slotted ALOHA mode. In an anti-collision system using this time-division mode, each moving body has, ideally by itself, one or more slots per period to transmit a message containing at least its position on a common channel. Each participating moving body has a time base synchronized with a common clock. The periodicity of synchronization may be variable, but it is often done once per period for, in most cases, the localization is done in a known way by means of satellites broadcasting a time information element.

In the known methods for broadcasting messages on position, each moving body occupies, without any particular precautions, a slot identified as being unoccupied during a preliminary phase of listening to the network.

This procedure has the drawbacks indicated further above.

Figure 2A:
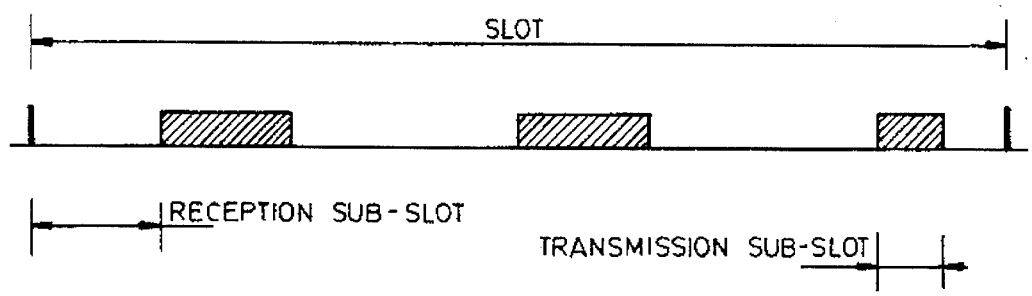
FIGS. 2a and 2b represent the division of the time of each slot done randomly according to two modes.

According to the invention, it is proposed, at least during one period, to carry out a random subdivision of a slot i identified as being unoccupied at the end of the preliminary listening phase. A subdivision such as this is shown in FIG. 2 according to two modes. In a first mode, shown in FIG. 2a, the duration and the position of the transmission sub-slots within the slot have any value and are determined randomly.

The random generation of variable magnitudes subjected to certain constraints is known in the prior art and shah not be described herein. In FIG. 2a, the transmission sub-slots have been represented by hatched rectangles while the reception sub-slots are represented by ordinary lines.

Figure 2B:
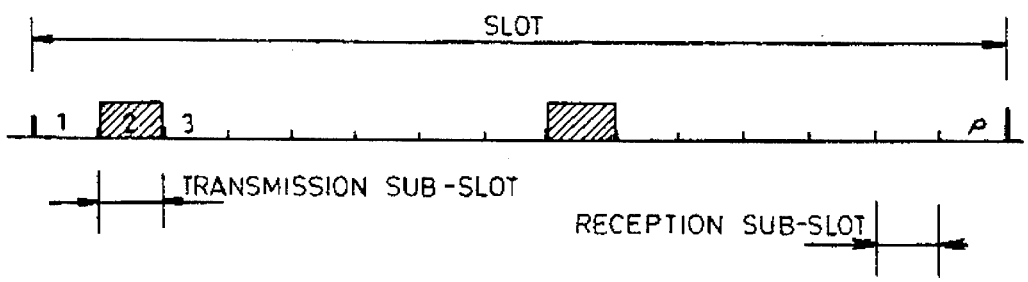

In a second mode shown in FIG. 2b, each slot is divided conventionally into p equal sub-slots having a rank 1-2 ... p.

Only the number and the rank of the transmission sub-slots are generated randomly. With slots having a duration of 25 ms, it is possible to envisage a number of sub-slots equal to about 10 so as to obtain sub-slots of 2.5 to 3 ms approximately.

Transmission periods such as these can be detected by receivers of the type commonly used in VHF or UHF communications.

The particular mode of operation of the method that shall be described hereinafter is of this type. It is divided into two phases. In a first phase, called an access phase, the moving body makes transmission, in the chosen slot i, only during a sub-slot whose rank is determined randomly.

If a transmission is detected in a sub-slot preceding the one in which transmission was to be made, no transmission is made and another unoccupied slot is chosen, if possible before the end of the period so as not to waste any time.

It is theoretically not necessary for a moving body to listen in the sub-slots subsequent to its own transmission since this transmission has probably sent every other user to another slot.

However, there remains a risk $1/p$ of not detecting a collision of messages between two users that have chosen the same sub-slot to make transmission in access search mode. This risk can be reduced to $1/p^2$ if, with no other presence having been detected, transmission is recommenced during the next period before the adoption of the slot thus selected (the risk will be reduced to $1/p^3$ if the operation is performed thrice and is continued in this way, but the access time to the channel is prolonged accordingly. A lengthy access time is not necessarily inconvenient since it arises out of a non-critical situation such as a starting of an operation or a low-traffic situation).

During the search for an unoccupied slot, the occupancy of a single sub-slot must be considered to be an occupancy.

Figure 3:
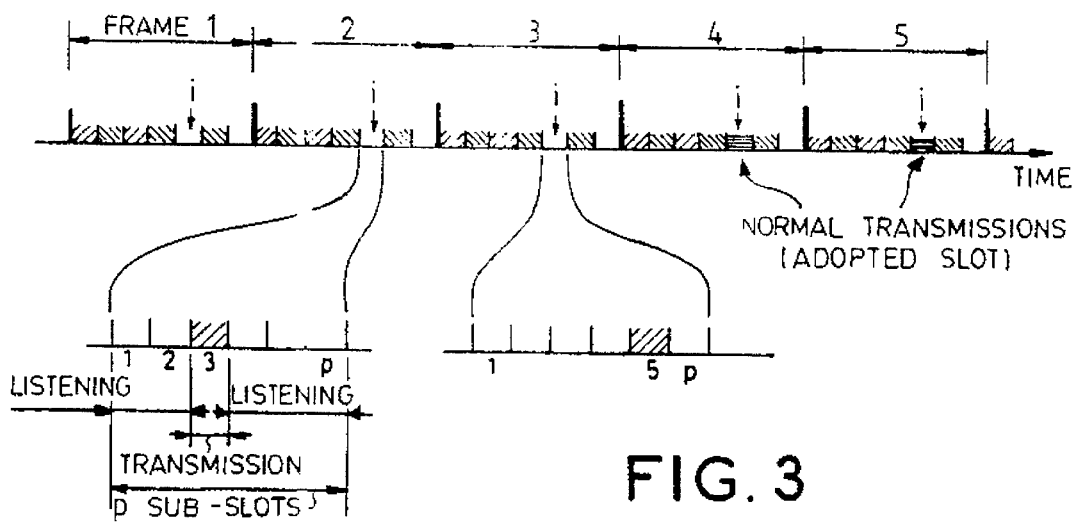
FIG. 3 shows the sequences of access to a slot.

FIG. 3 shows an example of access:

the slot i is detected as being unoccupied during the frame 1;

during the frame 2, the operation of drawing by lot has selected the sub-slot 3 for transmission which takes place because nothing has been received in the sub-slots 1 and 2;

during the frame 3, the sub-slot 5 is selected for transmission which takes place because nothing is received in the sub-slots 1 to 4;

during the frame 4 and beyond, the slot i is adopted.

In an alternative embodiment of this first phase, designed to promote fast access, especially to moving bodies searching for an additional slot for more frequent transmission, the relationship of random selection of the first transmission sub-slot is weighted by the parameter of the distance of the closest moving body. In this case, the mean value of the rank of the transmission sub-slot increases with the distance of the closest moving body. Consequently, the moving body which has the greatest need to transmit because of the proximity of another moving body has a greater probability of transmitting before the other moving body and therefore of occupying the slot before them: this reduces its access time.

The second phase of application of the method occurs when the moving body occupies a slot. This phase is aimed at ensuring that, despite the precautions taken as regards access, no other moving body can make transmission on this same slot.

Owing to the residual risk $1/p$, $1/p^2$, etc. during the access procedure, two participants may have chosen the same slot. This situation may occur also for participants initially at a distance from one another and out of range of one another during the access to the network and approaching one another and thus coming within range of one another.

To enable the detection of this state of collision, periodically and preferably with a slightly fluctuating period, for example on average one out of k frames, a user occupying a temporal slot in a stable way abandons its normal transmission during one frame to replace it, in this slot, with a transmission providing for at least one listening sub-slot. The listening sub-slot thus provided for in this slot will enable the detection either of the normal transmission of another user causing interference in the same slot or transmission in a simple sub-slot if a user that is a source of interference has also gone into listening mode during the same frame. The users searching for .access do not normally make transmission at this point in time since, in order to do so, they have to find a totally unoccupied slot in a frame.

When collision is detected, the following is the resolution procedure: a first user which is in listening mode, detects in its slot, either normal transmission from a second user or transmission limited to a sub-slot of a second user under non-collision control whose transmission has occurred before the sub-slot chosen by the first user. The second user has therefore not yet become aware of the state of collision. The first user, which is the only one to be informed of the situation, gives up its slot and looks for another one by the access procedure defined for the first phase. A preliminary listening during a period T is however not necessary because any user having already gained access to the network retains the full situation in memory. There is therefore no frame unused. The probability of non-detected collision is $1/kp$.

Figure 4:
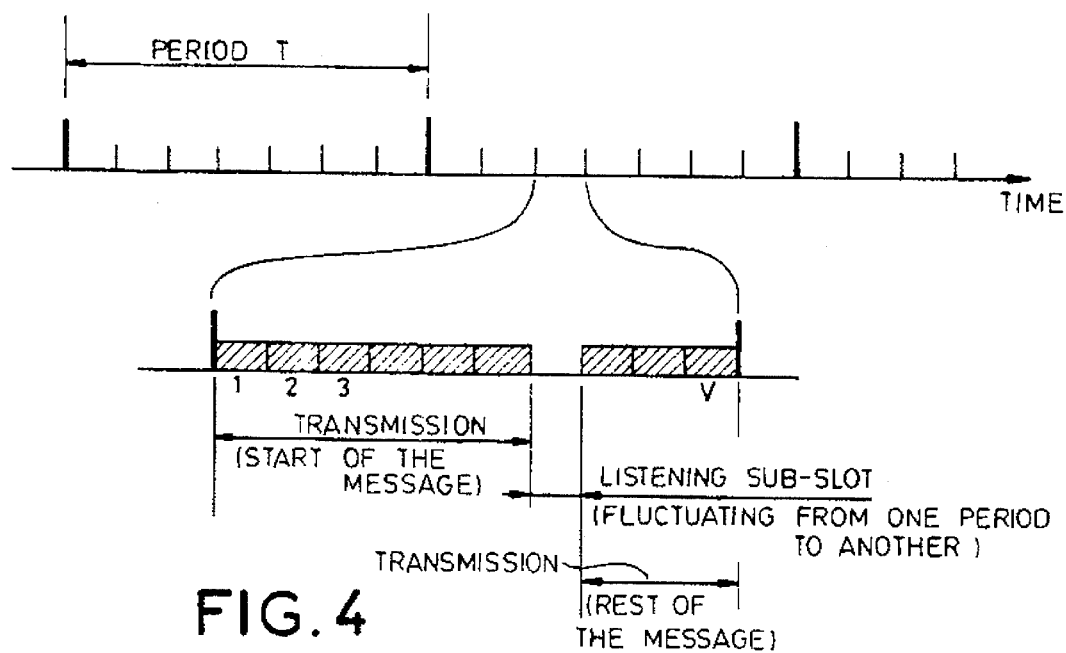
FIG. 4 shows the sequencing of the method during a phase of occupancy of a slot.

The non-detection is due to the impossibility of reception during transmission. One solution is to arrange for breaks in transmission. This is done in the above-described holding phase. One variant consists in arranging for these breaks in the transmitted message itself (FIG. 4). This slot is then subdivided into v identical sub-slots. During each transmission, the message is interrupted for one sub-slot chosen at random from among v sub-slots, this sub-slot being used for listening with a view to detecting a collision if any. In the event of collision, the first participant who has been informed (hence the one who has the earliest listening sub-slot) interrupts its transmission and undertakes to change its slot according to the access procedure defined for the first phase. The other user will therefore not be aware of the collision and will keep its slot. The choice of the same sub-slot by two users leads to a non-detection of the collision but this check is done at each frame and such a situation therefore cannot last.

For reasons of standardization it may be advantageous for the numbers p of sub-slots during the access phase and v of sub-slots during the occupancy phase to be equal.

The different embodiments of the invention that have just been described do not exclude one another. As already indicated, certain characters of one of the modes may be transposed into another mode.

Similarly, the random mode of operation described does not exclude the possibility of operation with control of the channel by a central station.

For this purpose it is possible to consider a system wherein, in the system without centralization, one slot (or more slots if necessary) per period is or are left routinely unoccupied. If a master station is in the vicinity, it will be able to use this slot to manage the sequencing of all the other messages.

The method according to the invention is also compatible with the possibility of enforcing access: if a user needs access without finding an unoccupied slot, it takes over a slot occupied by a distant user. This type of operation may furthermore be improved by taking account not only of the distance but also of the speed and by "stealing" the interval belonging to a distant user that is moving away. An accumulated criterion may be that of the estimated time during which the collision of messages will continue. It may also be planned, in this case, to skip a transmission from time to time in order to remain in listening mode so as to ensure that the relative position of the two moving bodies develops as planned.

The method according to the invention has been described essentially in its application to an anti-collision or traffic (for example air traffic) control system. All that has been stated with respect to this particular application can be applied, with the necessary changes, to any channel working in time-division mode with time divided conventionally into reproducible periods that are themselves divided into slots. The moving bodies are then users. The notion of proximity between two moving bodies then has to be replaced in general by the notion of degree of urgency for the transmission. This urgency is quantifiable in a known way by pre-established degrees with, for example, 1 corresponding to the maximum urgency and 2 to a lower level of urgency.

What is claimed is:

1. A method by which a moving body can search for an unoccupied time slot in a time-division communications channel for the transmission of a message comprising at least one information element on geographical position, the moving body participating with other moving bodies located in one and the same geographical zone in an anti-collision system in which the time is conventionally divided into reproducible time periods T, each period comprising a number N of time slots referenced 1, 2, 3 . . . i . . . N, the access to a time slot for the transmission of the message from the moving body being done by the identifying of the unoccupied time slots during at least one listening period T, followed by a random choice of one slot i from among the slots identified as being unoccupied, wherein:
   a) for at least one period after the moving body has decided to occupy the slot i, the time of this slot i is divided randomly into reception sub-slots R and transmission sub-slots E;
   b) so long as no transmission from another moving body has been received during the reception sub-slots R, a transmission is begun or continued during the following transmission sub-slots E of the slot i in progress and the slot i is kept during the following period;
   c) if a transmission is received from another moving body during a reception sub-slot R, there is no transmission made or there is no longer any transmission made during the following transmission periods E planned in the slot i in progress, and a new unoccupied slot j is chosen;
   d) the above operations a) and b) are carried out again on the slot j, and if a transmission is received from another moving body, the operation c) is carried out again.

2. A method according to claim 1, wherein the reception or transmission sub-slots conventionally constitute a set of p sub-slots of equal durations, each sub-slot having a rank referenced 1, 2, . . . r, . . . p, the random character of the distribution of the sub-slots into transmission and reception sub-slots being ensured by the random choice of the rank of the sub-slots intended for reception or transmission.

3. A method according to claim 2, wherein the number of transmission sub-slots is at most equal to (p−1).

4. A method according to claim 1 wherein, in a first phase, the random distribution of the transmission and reception sub-slots leads to a total reception time that is greater than the transmission time.

5. A method according to claim 3 wherein, in a first phase, the random distribution of the sub-slots leads to a number of reception sub-slots that is greater than the number of transmission sub-slots.

6. A method according to claim 4 wherein, in a second phase, the random distribution of the sub-slots leads to a total transmission time that is greater than the total reception time.

7. A method according to claim 5 wherein, in a second phase, the random distribution of the sub-slots leads to a number of transmission sub-slots that is greater than the number of reception sub-slots.

8. A method according to claim 4 wherein, during the first phase, the random distribution of the transmission and reception sub-slots leads to a first transmission sub-slot whose start occurs at a certain time θ1 after the start of the period, the value of the time θ1 being given by a random generation whose average output value increases with the distance between the moving body and that one of the other moving bodies which is closest to it.

9. A method according to claim 5 wherein, during the first phase, the random distribution of the transmission and reception sub-slots leads to a first $\gamma_1$ ranking transmission sub-slot, the value of the rank $\gamma_1$ being given by a random generation whose average output increases with the distance between the moving body and that of the other moving bodies which is closest to it.

10. A method of searching for an unoccupied slot in a time-division communications channel, the time being conventionally divided into reproducible time periods T, each period comprising a number N of time slots referenced 1, 2, 3 . . . i . . . N, the access to a time slot for the transmission of the user's message comprising an identifying of the unoccupied time slots during at least one listening period T, followed by a random choice of one slot i from among the slots identified as being unoccupied, wherein:
   a) for at least one period after the user has decided to occupy the slot i, the time of this slot i is distributed randomly into reception sub-slots R and transmission sub-slots E;

b) so long as no transmission from another user has been received during the reception sub-slots R, a transmission is begun or continued during the following transmission sub-slots E of the slot i in progress and the slot i is kept during the following period;

c) if a transmission is received from another user during a reception sub-slot R, there is no transmission made or there is no longer any transmission made during the following transmission periods E planned in the slot i in progress, and a new unoccupied slot j is chosen;

d) the above operations a) and b) are carried out again on the slot j, and if a transmission is received from another user, the operation c) is carried out again.

* * * * *